Dec. 30, 1930.   C. H. INGWER   1,787,155
MOTOR VEHICLE
Filed Feb. 17, 1927   2 Sheets-Sheet 1

INVENTOR
Carl H. Ingwer
BY Richey & Watts
ATTORNEYS.

Dec. 30, 1930.   C. H. INGWER   1,787,155
MOTOR VEHICLE
Filed Feb. 17, 1927   2 Sheets-Sheet 2
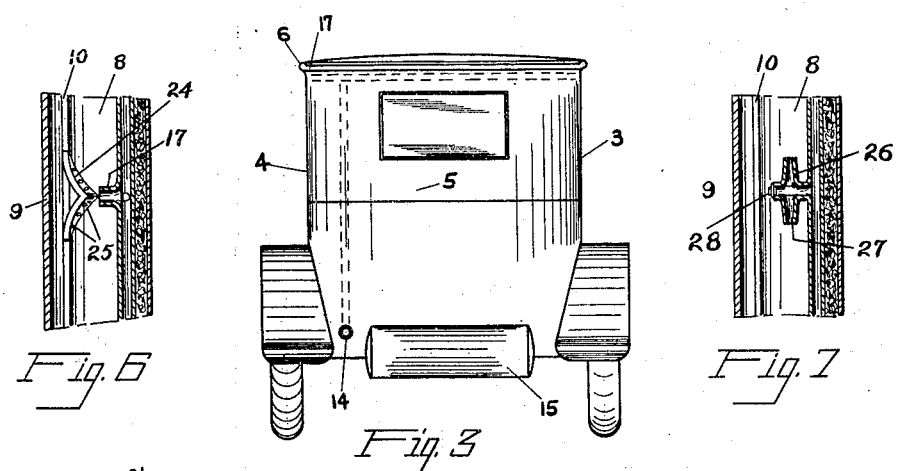
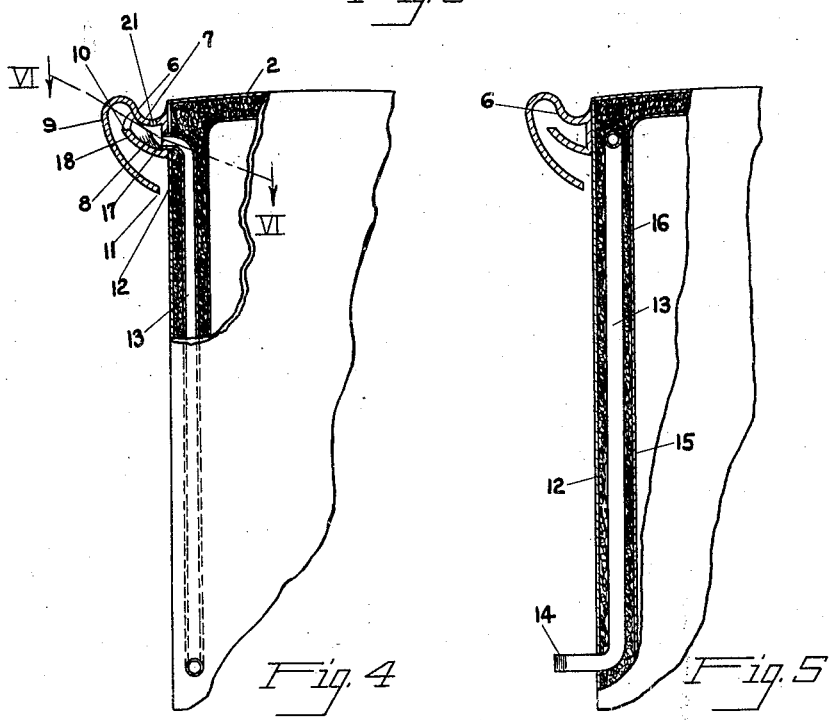
INVENTOR
Carl H. Ingwer
BY Rickey & Watts
ATTORNEYS Patented Dec. 30, 1930

1,787,155

UNITED STATES PATENT OFFICE

CARL H. INGWER, OF ELYRIA, OHIO

MOTOR VEHICLE

Application filed February 17, 1927. Serial No. 168,892.

This invention relates to a motor vehicle, and comprises more particularly a motor vehicle so constructed that the same may be cleansed with a minimum of effort and expense.

An object of the present invention is to provide means mounted on a motor vehicle to which may be attached a source of water under pressure and which will distribute the water to the upper marginal portions of the motor vehicle body, dischaging the water therefrom downwardly so as to sweep the exterior of such body.

Other objects of my invention and the invention itself will become apparent from the description of a specific embodiment of my invention, and in which description reference will be had to the accompanying drawings forming a part of this specification.

Referring now to the drawings—

Fig. 3 is a rear elevation thereof.

Fig. 4 is a rear elevational view of a portion of the motor vehicle of the foregoing figures, a portion of the same being broken away so as to expose in vertical section some of the inner parts thereof.

Fig. 5 is a view similar to that of Fig. 4 being taken at right angles to the view of Fig. 4.

Fig. 6 is a section on the line VI—VI of Fig. 4, and,

Fig. 7 is a section similar to Fig. 6 of a slightly modified structure.

Figure 1:
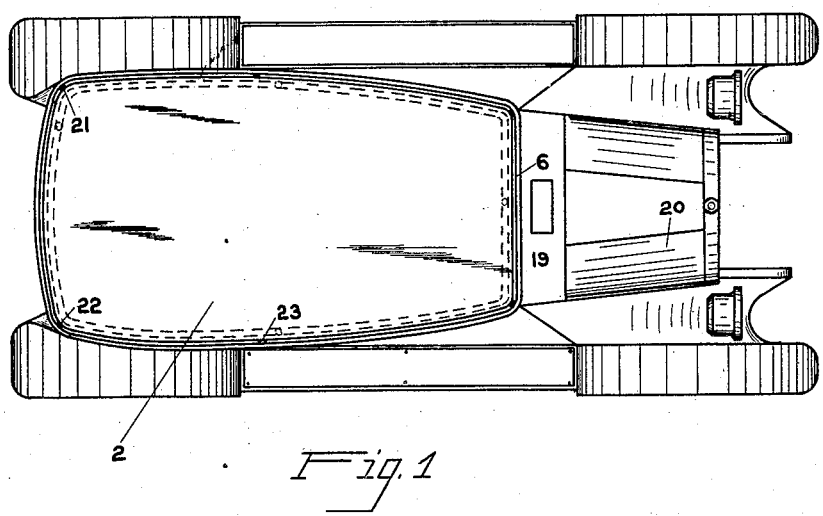
Fig. 1 shows a top plan view of a motor vehicle which embodies my invention.
Figure 2:
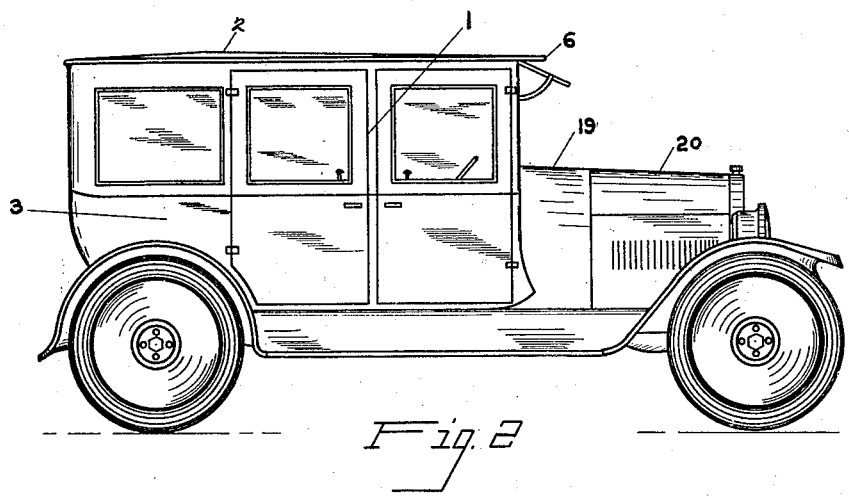
Fig. 2 is a side elevational view of the same.

Referring now to the drawings, the different figures of which show similar parts designated by like reference characters, at 1 I show a motor vehicle body, such as is commonly known as a sedan automobile body. At 6 I show an approximately scroll shaped conduit extending laterally from the sides, rear and front portion of the motor vehicle body, and disposed adjacent the top 2.

The conduit comprises an eaves drainage portion 7 and a cleaning water carrying channel 8 disposed below the said eaves together with an enclosing portion 9 depending from the border of the eaves portion 7, being lopped over the edge 10 of the cleaning water channel portion 8, extending inwardly and below the wall of said channel portion and terminating at 11 adjacent the exterior wall 12 of the motor vehicle body. Thus there is a relatively small space provided between the end 11 of the enclosing member 9 and the motor vehicle body wall 12. This scroll-shaped conduit generally designated by the reference numeral 6 in the drawings, is preferably mounted as shown adjacent the top of the vehicle and extending laterally from the edge all around the four sides of the top, although obviously my invention comprising such scroll-shaped conduit may be employed on motor vehicles less extensively than entirely around the border of the top or could be mounted in other positions than the edge of the top, as upon the upper surface thereof.

A charging conduit 13 leading from an attaching end 14 preferably located at the rear lower portion of the vehicle, for instance, adjacent the gasoline tank, extends upwardly therefrom between the outer wall 12 and the inner wall 15 of the motor vehicle body, being preferably encased in a packing material 16 which may be provided between the said walls. Conduit 13 leads to the so-called scroll-shaped conduit 6 at one or more points such as that indicated at spout 17.

It is desirable, particularly if the pressure of the water supply be high, to interpose some form of deflector in front of each spout, so that the water will not all flow up wall 18 at the spout without distributing itself along channel 8. In Fig. 6, one form of such a deflector is shown which comprises a wedge-shaped baffle 24 positioned to split the stream of water from spout 17 and to deflect it to both sides. This baffle may be provided with apertures 25 which permit enough water to pass therethrough to clean the wall below the baffle.

In Fig. 7 another form of deflector is shown. This consists of a compound nozzle 26 attached to the spout, the nozzle having large openings 27 for directing the bulk of the water sidewise into channel 8 and a small opening 28 for allowing enough water to run directly over wall 18 to wash the wall 12 below the nozzles.

I preferably also dispose the channel portion 8 so that the points 17, designating the opening into the said channel portion 8 to admit the conduit 13, are lower than the remainder of the channel, so that when the motor vehicle is standing on level ground any water which may be contained in the channel 8 will naturally drain through the openings 17 and through the pipe 13, being discharged at the opening 14 thereof.

To the threaded portion 14 of the pipe 13 a garden hose or other source of cleaning water is attached and the water under pressure will flow through the conduit 13 into the channel 8, rising in the channel until this is completely full, after which the water will flow over the rim 10 of the said channel portion entirely around the vehicle and overflowing the rim 10 will be caught by the downwardly extending portion of the enclosing arm 9, and will flow inwardly and downwardly against the side 12 of the motor vehicle, being led thereto by such downwardly and inwardly depending arm 9. The water flowing down the sides of the vehicle will clean the same. When desired, the operator can expedite the cleaning by using a sponge or the like in the usual manner, with the exception that in the present case the flow of cleaning water will continue without any attention in amounts desired and predetermined by the amount flowing through the garden hose. This water flowing down the sides of the vehicle will wet the sides of the same and clean them, at the same time wetting and cleaning the fenders, running board and other parts of the motor vehicle. A film of water is maintained on the painted surface throughout the washing operations and prevents scratching of paint, as well as permitting the washer to have both hands free with which to work. That portion of the conduit 6 which extends across the front of the vehicle will cause water to be directed downwardly therefrom flowing over the cowl 19, hood 20, etc.

I contemplate also, in some embodiments of my invention, providing a perforated pipe along the longitudinal medial portion of the said cowl and hood, but elevated slightly thereabove, said pipe being connected to the conduit 13 so as to increase the flow of water downwardly over the said cowl and hood. The invention can also be applied to other parts of a car, as, for instance, the fenders, running board and the like.

At 21, 22, 23 and elsewhere, I show perforations extending through the eaves 7 to permit water contained in the eaves 7 to flow into the channel 8 and to be discharged therefrom through the conduit 13 in the event that water collects in the said eaves by the vehicle being exposed to rain or any source of water from above the vehicle.

Having thus described my invention in a specific embodiment, I am aware that numerous and extensive departures may be made from the embodiment herein illustrated and described, but without departing from the spirit of my invention.

I claim:

1. In a motor vehicle, the combination with a motor vehicle body, a top therefor, a conduit supported by the vehicle adjacent the border portion of the said top, means to connect a source of water under pressure to the said conduit, said conduit being effective to discharge water against the sides of the motor vehicle adjacent the top, said conduit being approximately scroll-shaped and having superposed rain water conducting eaves, and cleansing water conducting channel portions, said eaves portion being disposed above the said channel portion, said eaves portion containing openings to drain water therefrom into the said channel portion.

2. In a motor vehicle, the combination with a motor vehicle body, a top therefor, a scroll shaped conduit supported by the vehicle adjacent the border portion of the said top, means to connect a source of water under pressure to the said conduit, said conduit being effective to discharge water against the sides of the motor vehicle adjacent the top, said conduit having superposed rain water conducting eaves, and cleansing water conducting channel portions, said scroll shaped conduit having an intermediate portion secured to the sides of the vehicle, and one end thereof extending upwardly to form a cleansing water containing and distributing channel, the other end extending upwardly over the said channel thence downwardly and inwardly to enclose the same and to direct cleansing water overflowing the said channel laterally and inwardly against the sides of the vehicle.

3. In a motor vehicle, the combination with a motor vehicle body, a top therefor, a conduit supported by the vehicle adjacent the border portion of the said top, means to connect a source of water under pressure to the said conduit, said conduit being effective to discharge water against the sides of the motor vehicle adjacent the top, said conduit being approximately scroll-shaped and having superposed rain water conducting eaves, and cleansing water conducting channel portions, said scroll having an intermediate portion secured to the sides of the vehicle, and one end thereof extending upwardly to form a cleansing water containing and distributing channel, the other end extending upwardly over the said channel thence downwardly and inwardly to enclose the same and to direct cleansing water overflowing the said channel laterally and inwardly against the sides of the vehicle, said other scroll end comprising a rain water drainage eaves superposed over the said channel.

4. In a motor vehicle, the combination with a motor vehicle body, a top therefor, a conduit supported by the vehicle adjacent the border portion of the said top, means to connect a source of water under pressure to the said conduit, said conduit being effective to discharge water against the sides of the motor vehicle adjacent the top, said conduit being approximately scroll-shaped and having superposed rain water conducting eaves, and cleansing water conducting channel portions, said scroll having an intermediate portion secured to the sides of the vehicle, and one end thereof extending upwardly to form a cleansing water containing and distributing channel, the other end extending upwardly over the said channel thence downwardly and inwardly to enclose the same and to direct cleansing water overflowing the said channel laterally and inwardly against the sides of the vehicle, a conduit leading to the said channel from the exterior lower portion of the vehicle to communicate water under pressure to the channel.

5. In a motor vehicle, the combination with a motor vehicle body, a top therefor, a conduit supported by the vehicle adjacent the border portion of the said top, means to connect a source of water under pressure to the said conduit, said conduit being effective to discharge water against the sides of the motor vehicle adjacent the top, said conduit being approximately scroll-shaped and having superposed rain water conducting eaves, and cleansing water conducting channel portions, said scroll having an intermediate portion secured to the sides of the vehicle, and one end thereof extending upwardly to form a cleansing water containing and distributing channel, the other end extending upwardly over the said channel thence downwardly and inwardly to enclose the same and to direct cleansing water overflowing the said channel laterally and inwardly against the sides of the vehicle, a conduit leading to the said channel from the exterior lower portion of the vehicle to conduct water under pressure to the channel, the point of connection of the said conduit to the said channel being the lowermost portion of the channel.

In testimony whereof I hereunto affix my signature this 1st day of February, 1927.

C. H. INGWER.